United States Patent
Hohl et al.

(10) Patent No.: US 7,113,172 B2
(45) Date of Patent: Sep. 26, 2006

(54) ALPHANUMERIC KEYPAD AND DISPLAY SYSTEM AND METHOD

(75) Inventors: David Hohl, Milpitas, CA (US); Imre Trefil, San Ramon, CA (US); Anthony Yung, Saratoga, CA (US); Frances Killam, Chelmsford, MA (US)

(73) Assignee: Lifescan, Inc., Milpitas, CA (US)

( * ) Notice: Subject to any disclaimer, the term of this patent is extended or adjusted under 35 U.S.C. 154(b) by 143 days.

(21) Appl. No.: 10/008,472

(22) Filed: Nov. 9, 2001

(65) Prior Publication Data
US 2003/0090467 A1    May 15, 2003

(51) Int. Cl.
*G09G 5/00*    (2006.01)

(52) U.S. Cl. .................................. 345/168; 345/172

(58) Field of Classification Search ........ 345/168–173; 341/22, 23, 26; 379/93.18, 368
See application file for complete search history.

(56) References Cited

U.S. PATENT DOCUMENTS

| | | | | |
|---|---|---|---|---|
| 4,117,542 A * | 9/1978 | Klausner et al. | ............. | 708/109 |
| 4,567,573 A * | 1/1986 | Hashimoto et al. | ........... | 704/10 |
| 5,128,672 A * | 7/1992 | Kaehler | .................. | 341/23 |
| 5,258,748 A * | 11/1993 | Jones | .................... | 345/172 |
| 5,825,353 A * | 10/1998 | Will | .................. | 345/184 |
| 5,952,942 A * | 9/1999 | Balakrishnan et al. | ........ | 341/20 |
| 6,184,803 B1 * | 2/2001 | Burrell, IV | ............... | 341/22 |
| 6,271,835 B1 * | 8/2001 | Hoeksma | ................ | 345/168 |
| 6,320,942 B1 * | 11/2001 | Chang | .................. | 379/93.27 |
| 6,348,878 B1 * | 2/2002 | Tsubai | .................. | 341/23 |
| 6,597,345 B1 * | 7/2003 | Hirshberg | ............... | 345/168 |

FOREIGN PATENT DOCUMENTS

| | | |
|---|---|---|
| EP | 0 397 164 | 12/1993 |
| EP | 0 733 963 | 3/1996 |
| GB | 2242047 | 12/1991 |
| WO | WO 99/37025 | 9/1998 |
| WO | WO 01/71746 | 2/2001 |

OTHER PUBLICATIONS

"Parallel Checksum Calculation Accelerator," IBM Technical Disclosure Bulletin, IBM Corp, New York, Dec. 1, 1993, 36ϴ12):647-648.

R.W. Knodt, "Smart Virtual Keyboard System Suitable for Mouse or Stylus Entry," (1993) Xerox Disclosure Journal, Xerox Corporation, Stamford, CT., 18(3):245-246.

3 pgs, Austrian Written Opinion dated Sep. 23, 2005.

* cited by examiner

Primary Examiner—Regina Liang
(74) Attorney, Agent, or Firm—Kagan Binder, PLLC; Kimberly S. Jordahl

(57) ABSTRACT

Data entry and display apparatus and methods that provide greater efficiency in data processing devices. The apparatus comprises a keypad with a plurality of first keys and plurality of secondary keys, the first keys each having at least one primary alphanumeric symbol and at least one of the first keys having a secondary alphanumeric symbol associated therewith, the first key with the secondary symbol being operable to selectively display the secondary alphanumeric symbols in association with the second keys. The apparatus may further comprise a display, which may be embodied in a common touch screen user interface with the keypad. The methods comprise actuating one of the first keys on the keypad and displaying a set of secondary alphanumeric symbols in association with the secondary keys, and selecting the primary alphanumeric symbol associated with the first key or selecting one of the set of secondary alphanumeric symbols by actuating one of the second keys. Selection and actuation of appropriate combinations of first and second keys allows entry of any character string.

12 Claims, 8 Drawing Sheets

ALPHANUMERIC KEYPAD AND DISPLAY SYSTEM AND METHOD

BACKGROUND OF THE INVENTION

Hand-held data processing devices with data entry and display functions are increasingly used in numerous situations. Well-known examples of such devices include cellular telephones and "personal digital assistant" (PDA) devices. As greater processing power and decreased device size become more readily available, the use of hand-held data processing devices in medical, health care, financial, engineering and other settings will become increasingly widespread. The effective entry of data by users and the rapid processing and display of such data are important considerations in hand-held data processing devices. Various drawbacks, however, exist in the data entry and display provided by the currently available hand-held data processors.

Particularly, the small size of such hand held devices often complicates the entry of data via alphanumeric keypad, keyboard or touch screen. Various mechanisms for user entry of alphanumeric characters have been employed in hand-held devices. One such approach has been the use of a full "QWERTY" keyboard on the device display, as occurs in many PDA devices. The full keyboard is familiar to most users, and the pressing or actuation of only a single key is needed to enter and display the corresponding alphanumeric character. Display of a full keyboard on a small device, however, requires that the individual keys or buttons be very small, and the use of a stylus is necessary for data entry.

Another approach to data entry has been use of a conventional telephone alphanumeric keypad wherein multiple pressing or actuation of an individual key allows cycling through each of several characters associated with the key. For example, when the "2" key is initially pressed, a "2" is correspondingly displayed on the device display. Pressing the "2" key again changes the displayed "2" to an "A", while a third pressing of the "2" key results in display of a "B", and so on. While this approach allows data entry with a relatively small alphanumeric keypad, the entry of an individual alphanumeric symbol can require as many as four presses of a key to obtain a desired character. The entry of alphanumeric strings in this manner is not intuitive and is difficult for un-trained users. Further, many telephone keypads do not provide for the "Q" and "Z" characters, and entry of these characters must be accommodated by pressing a combination of two or more keys or by other data entry arrangement.

Still another approach to data entry has been to provide different portions of a display on different screen images, with a button or key provided to allow switching between the multiple screen images. For example, a first screen may be used to display numbers, while additional screens are used to display alphabetic characters. The overall number of screens required to display all alphanumeric characters depends on the size of the display. Three or four such screens are often required for a small display. The entry of alphanumeric strings can be quite complex and time consuming due to the necessity of switching between screens.

Another important consideration in the operation of handheld data processing devices is error detection for digital data processed by the device. Error detection is typically carried out using cyclic redundancy check (CRC) calculation that is typically implemented by a division algorithm embodied in software, which is relatively slow and involves considerable computational overhead.

One approach to faster CRC calculation has been through use of a software lookup table in conjunction with AND and XOR operations to perform the equivalent of the division algorithm. This technique is still relatively slow for large data streams, and requires a significant amount of memory to store the look-up table (e.g., 512 bytes for a 16-bit CRC). An even faster technique utilizes a CRC circuit embodied in hardware, together with a software loop that increments through the data stream, writing each byte to the CRC circuit which performs the division algorithm. While use of a CRC circuit increases speed, the overhead of the software loop can still require relatively long periods of time for large streams of data.

Still another consideration in hand-held data processing devices is the time associated with writing data to the device display, which is typically a pixel-based liquid crystal display (LCD). Data output to a display controller typically involves a software-executed loop that increments through the output data stream, writing a byte at a time to the display controller. This arrangement is slow for pixel-based displays, as many bytes must generally be written in order to draw an alphanumeric character or icon on the display, and the overhead of the software loop is increased by each byte that is thus written.

Many work environments require that multiple users have access to hand held data processing devices, and validation of authorized users is yet another important consideration in the design and operation of such devices. The standard technique for user validation is entry of an identification (ID) character string by the user. The entered string is compared against a list of authorized strings maintained in an array or list in the device memory. The software searches through the list and compares the string of interest against each stored entry until a match is found or until the list of stored strings is exhausted. The list is typically arranged in sort order, and a binary search is performed. String comparison in this manner, however, can require a large amount of memory to store the authorized string list where the list is large and the string length is long. For example, storage of 4,000 strings with an 18 character maximum length requires 72,000 bytes. Further, the time required for string comparison, which is dependent upon the string length, can be quite long and result in substantial delay during user validation.

There is accordingly a need for hand-held data processing devices and methods that allow quick and easy entry of alphanumeric characters by users, that provides for rapid error checking of data during operation and rapid writing of data to a display, and which provides for rapid character string comparison for user authentication. The present invention satisfies these needs, as well as others, and generally overcomes the deficiencies found in the background art.

SUMMARY OF THE INVENTION

The invention provides data entry and display apparatus and methods usable in hand held data processing devices. The apparatus of the invention comprise, in general terms, a keypad including a plurality of first, fixed, keys and plurality of second, soft keys, with one or more of the first keys having at least one primary alphanumeric symbol associated therewith, and with one or more of the first keys having at least one secondary alphanumeric symbol associated therewith and being operable to selectively display the secondary alphanumeric symbols in association with the secondary keys. The apparatus may further comprise a display operable to display selected primary and secondary alphanumeric symbols according to actuation of the first and second keys.

The apparatus may further comprise a direct memory access controller and a cyclic redundancy check circuit operatively coupled to each other, with the direct memory access controller configured to transfer data to the cyclic redundancy check circuit for check calculations. The apparatus may still further comprise a display controller operatively coupled to the direct memory access controller, with the direct memory access controller configured to transfer display data to the display controller. The apparatus may additionally comprise a stored list of authorized character string check values usable to compare to calculated check values for identification character strings entered by a user.

The methods of the invention comprise providing a keypad including a plurality of first, fixed, keys and plurality of second, soft keys, with one or more of the first keys having at least one primary alphanumeric symbol associated therewith, and with one or more of the first keys having at least one secondary alphanumeric symbol associated therewith, actuating one of the first keys having an associated secondary alphanumeric symbol, and displaying the secondary alphanumeric symbol in association with the second keys. The methods may further comprise selecting the primary alphanumeric symbol associated with the actuated first key, and/or selecting a secondary alphanumeric symbols by actuating one of the second keys. The methods may additionally comprise displaying the selected alphanumeric symbols.

The methods may further comprise actuating an additional first key to display additional secondary alphanumeric symbols in association with the second keys, and selecting the primary alphanumeric symbol on the additional first key, or actuating one of the second keys to select one of the secondary alphanumeric symbols thereon, and displaying the selected alphanumeric symbol. The methods may still further comprise actuating an nth first key to display an nth set of secondary alphanumeric symbols on the second keys, selecting one of the nth primary or secondary alphanumeric symbols, and displaying the selected alphanumeric symbol.

In certain embodiments, the subject methods may comprise providing a data processor in association with the keypad, transferring data, by a direct memory access controller to a cyclic redundancy check element, and calculating check values for the transferred data by the cyclic redundancy check element. The data may be associated with the alphanumeric characters selected on the keypad. The methods may additionally comprise transferring display data from the memory to a display controller using a direct memory access controller, and displaying the display data. The methods may still further comprise comparing a calculated check value for an identification string entered by a user to a list of stored, authorized check values, and determining validity or authorization of the calculated check value for the entered identification string. The methods may further comprise creating and storing the list of authorized check values.

BRIEF DESCRIPTION OF THE DRAWINGS

The invention will be more fully understood by reference to the following drawings, which are for illustrative purposes only.

DETAILED DESCRIPTION OF THE INVENTION

Before the subject invention is described further, it should be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

Any definitions herein are provided for reason of clarity, and should not be considered as limiting. The technical and scientific terms used herein are intended to have the same meaning as commonly understood by one of ordinary skill in the art to which the invention pertains.

The terms "alphanumeric character" and "alphanumeric symbol" and grammatical equivalents thereof as used herein means any numeral, alphabetic letter, monosyllabic symbol, polysyllabic symbol, text symbol, math symbol or any other symbol which may be used in the entry of data from a keyboard or keypad by a user. Exemplary "alphanumeric characters" include, by way of example, roman alphabet letters, Arabic numerals, and punctuation symbols such as "periods", "commas", "hyphens" and the like.

The invention provides devices and methods for fast, easy and efficient use of hand held data processing devices. Hand held computing devices often have only small keypad and display areas available, as well as limited memory capability. The inventive devices and methods provide for, inter alia, quick and easy entry of alphanumeric characters on a small keypad or keyboard, rapid check word calculation for data transfers, fast writing of data to the device display, and fast and efficient authentication of user identification character strings.

Referring more specifically to the drawings, for illustrative purposes the present invention is embodied in the apparatus and methods shown generally in FIG. 1 through FIG. 6. It will be appreciated that the apparatus may vary as to configuration and as to details of the parts, and that the method may vary as to detail and the order of the events or acts, without departing from the basic concepts as disclosed herein. The invention is disclosed primarily in terms of use in handheld data processors or computers. However, it will be readily apparent to those skilled in the art that the invention may be used with any type of data processor, including, for example, desktop and laptop computers. It should also be apparent to those skilled in the art that various functional components of the invention as described herein may share the same logic and be implemented within the same circuit, or in different circuit configurations.

Figure 1:
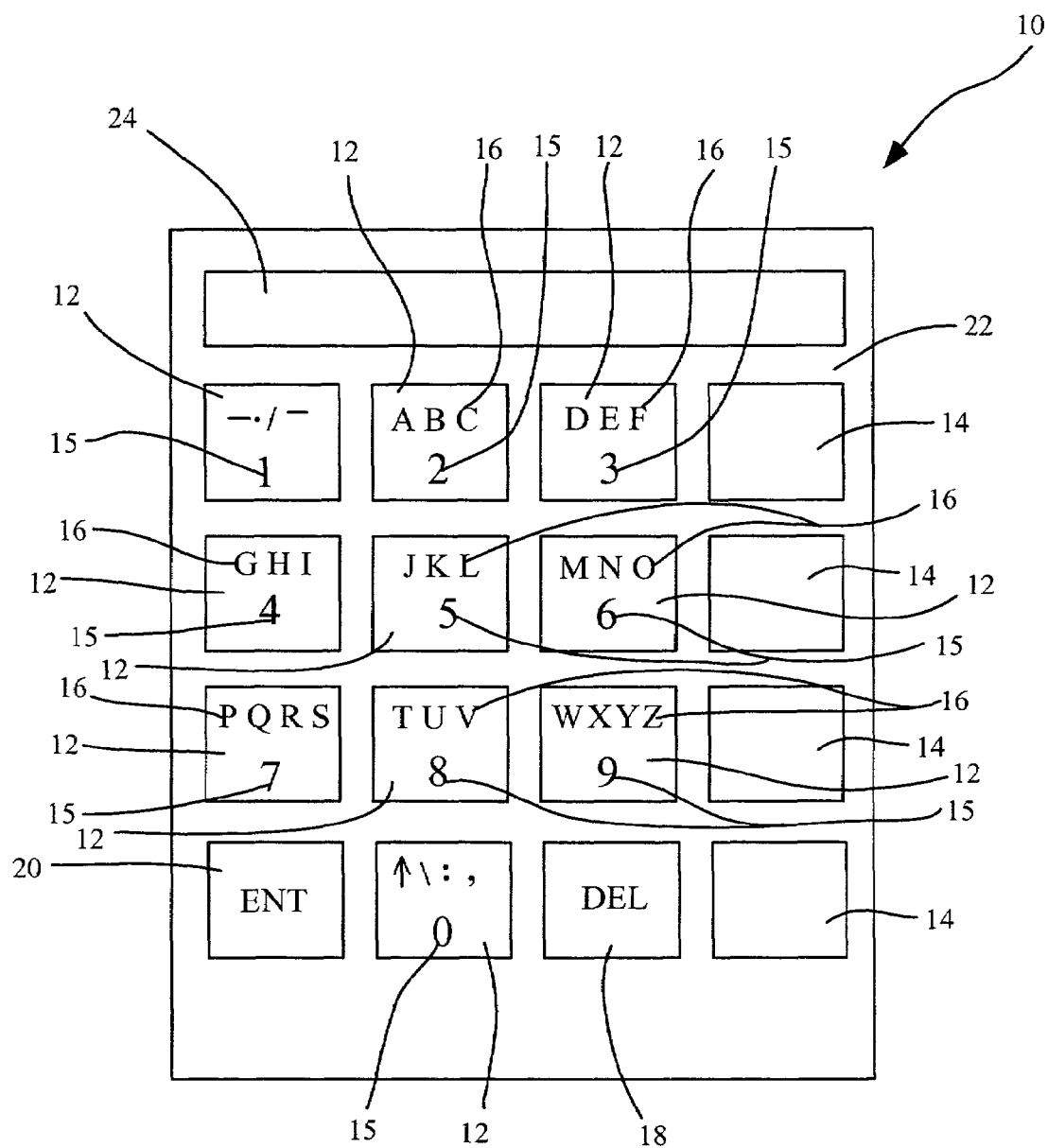
FIG. 1 is a schematic illustration of a keypad in accordance with the invention.

Referring now to FIG. 1, a keyboard or keypad 10 in accordance with the invention is shown. Keypad 10 includes a plurality of first, "hard" or "fixed" keys 12, and a plurality of second, "soft" keys 14. Each of the first or fixed keys 12 on the keypad has at least one primary alphanumeric symbol 15. Additionally, one or more of the fixed keys may have a secondary alphanumeric symbol or symbols 16 associated therewith. As shown, a primary alphanumeric symbol 15 in the form of a single number or numeral is located on the central, lower portion of each of the first keys 12, while secondary alphanumeric symbols 16 in the form of three or four roman alphabet characters or text-related symbols are located in the upper portion of the first keys 12. The first keys 12 thus display alphanumeric characters in a manner similar to conventional telephone keypads. The first key 12 displaying the number "1" as a primary alphanumeric symbol includes, instead of alphabet letters, the symbols for "underscore", "period", "slash" and "dash" as secondary alphanumeric characters. The first key 12 displaying the number "0" as a primary alphanumeric symbol also displays non-letter secondary symbols corresponding to "blank space", "backslash", "colon" and "comma".

Primary and secondary alphanumeric symbols 15, 16 may be displayed elsewhere on first keys 12, or may be displayed adjacent to the first keys 12 or elsewhere in association with the first keys 12. A delete or backspace key 18 is included to allow deletion of alphanumeric character entries as described below, and an "enter" key 20 is provided that may be used to enter completed character strings, or as a reset key, or which may be programmable to carry out a selectable function upon actuation of the key 20.

The number of second, soft keys 14 as shown corresponds to the maximum number of secondary alphanumeric symbols 16 associated with each of the first keys 12. Upon selection and actuation of one of the first keys 12, the corresponding secondary alphanumeric symbols 16 associated with the actuated first key 12 are displayed in association with the second keys 14, with one secondary alphanumeric symbol 16 displayed in association with a corresponding second key 14. The secondary alphanumeric symbols 16 may be displayed directly on the second keys 14 as shown, or displayed adjacent to the second keys 14, or displayed elsewhere in association with second keys 14.

In the embodiment shown in FIG. 1, keypad 10 is in the form of a touch screen that is overlaid on or superimposed with a display 22. Display 22 may comprise a liquid crystal, LED, CRT or other form of display. In handheld embodiments, display 22 will often be in the form of a liquid crystal display or LCD. Touch screen/display 22 includes a field 24 wherein are displayed alphanumeric characters selected according to selective actuation of the primary or first keys 12 and second keys 14 as described below.

By selective actuation of the appropriate first keys 12 and second keys 14, any string of alphanumeric characters may be entered on the keypad 10. The pressing or actuation of a selected first key 12 results in the displaying of the primary alphanumeric character 15 of the selected first key 12 on display field 24, and also results in the display of the corresponding secondary alphanumeric symbols 16 on the soft keys 14. If the primary alphanumeric symbol 15 displayed on display 24 is the symbol that the user wished to enter, the secondary keys 14 are not actuated. If, on the other hand, the user wishes to enter one of the secondary alphanumeric characters associated with the second keys 14, the user may actuate appropriate second key 14. This results in replacement of the displayed primary alphanumeric character (number) in field 24 with the selected secondary alphanumeric character (letter).

Figure 2A:
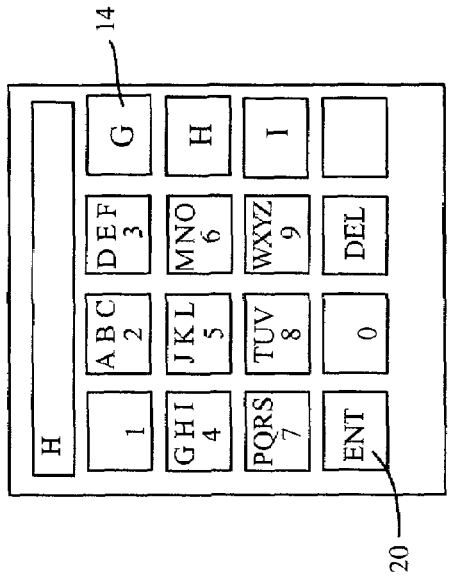
FIG. 2A through FIG. 2H illustrate the entry of an alphanumeric character string on the keypad of FIG. 1

The operation of the keypad of FIG. 1 is illustrated in FIG. 2A through FIG. 2H. In FIG. 2A, a first fixed key 12, which displays the primary alphanumeric character "4" and the set of secondary alphanumeric characters "G", "H", and "I", is selected and pressed or actuated by a user. Actuation of the first key 12 results in display of the number "4" in display field 24, and results in the display of the letters "G", "H" and "I" on the second keys 14. If the user, at this point, merely wished enter the number "4", the enter button 20 may be selected. If the user instead wished to enter "G", "H" or "I", the appropriate second key 14 is selected and actuated.

Figure 2B:
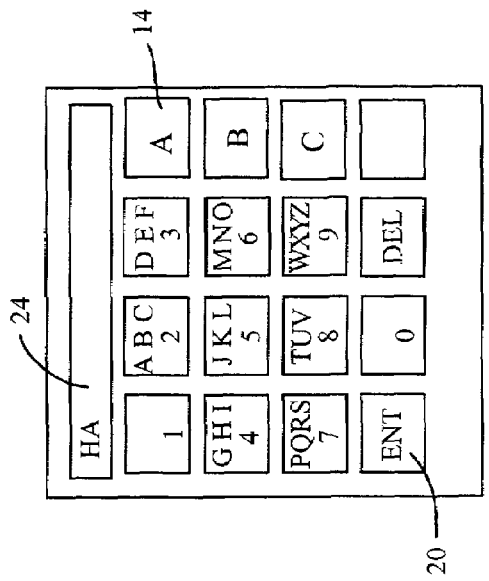

Selection and actuation of the second key 14 displaying the letter "H" by a user, as shown in FIG. 2B, results in replacement of the number "4" with the letter "H" in the display field 24. The user may alternatively select "G" or "I" from this set of secondary alphanumeric characters. If the letter "H" as shown in FIG. 2B represents the entire character string that the user wishes to enter, the enter key 20 may be pressed.

Figure 2C:
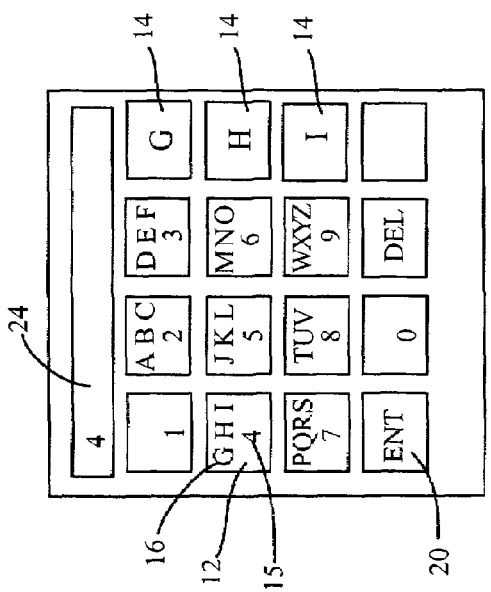
Figure 2D:
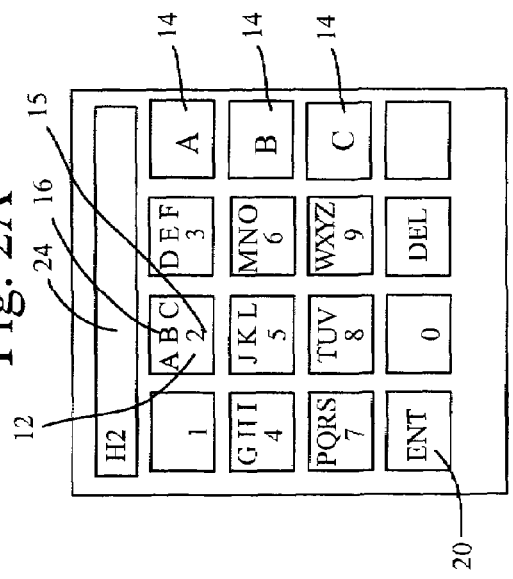

The user may continue to expand the list of entered alphanumeric characters by selecting and actuating the appropriate first keys 12 and/or second keys 14. As shown in FIG. 2C, selection and actuation of a second fixed key 12 with a primary alphanumeric symbol "2" and a set of secondary alphanumeric symbols "A", "B" and "C", is shown, which results in display of the number "2" in field 24 next to the previously selected "H", and displays the letters "A", "B" and "C" on the soft keys 14. The user may at this point press the enter key 20 to enter the character string "H2". Or, as shown in FIG. 2D, selection and actuation of the second key 14 corresponding to the letter "A" selects "A" from this second set of alphanumeric characters, and results in replacement of the number "2" in the display field 22 with the letter "A" such that "HA" is displayed in field 24. The user may enter the character string "HA" or continue to selective actuation of first keys 12 and second keys 14 to increase the length of the character string.

Figure 2E:
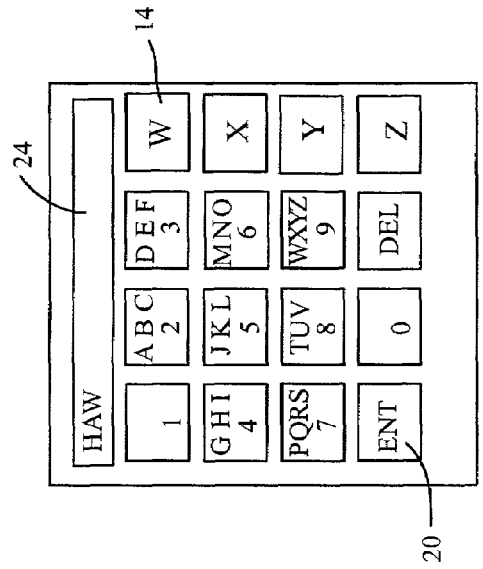
Figure 2F:
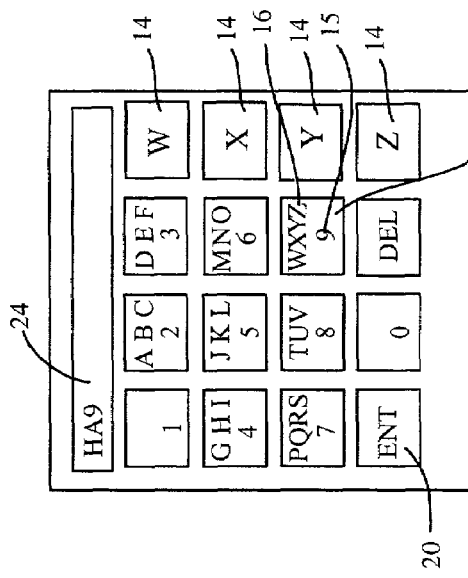

In FIG. 2E, user selection and actuation of the first key 12 associated with the primary alphanumeric symbol "9" and set of secondary alphanumeric symbols "W", "X", "Y" and "Z" results in display of the number "9" such that "HA9" appears in display field 24, and also results the display of the letters "W", "X", and "Z" in the second keys 14. The user may enter the character string "HA9", or continue to select additional characters. Selection and actuation of the second key 14 corresponding to "W" as shown in FIG. 2F results in replacement of the displayed "9" with the selected character "W" such that field 24 displays the alphanumeric characters "HAW".

Figure 2G:
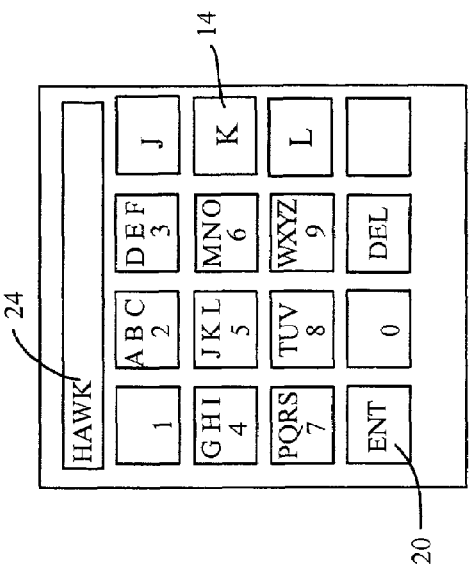
Figure 2H:
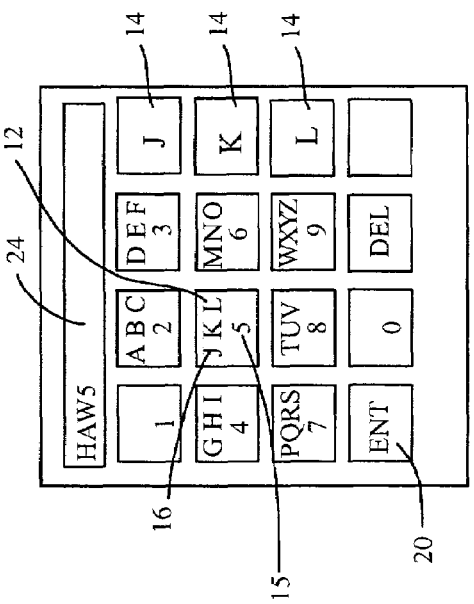

FIG. 2G shows selective actuation of a fourth fixed key 12 corresponding to the primary alphanumeric character "5" and a fourth set of alphanumeric characters "J", "K" and "L", such that "HAW5" is displayed in field 24. The user may enter the character string "HAW5" or continue to change or lengthen the character string by pressing additional keys. Selective actuation of the second key 14 corresponding to "K", for example, replaces the "5" in field 24 with "K" such that the desired alphanumeric character string "HAWK" is displayed, as shown in FIG. 2H. At this point, the user may actuate the "enter" key 20 to enter the selected alphanumeric character string "HAWK" for data processing as described further below. Or, the user may continue to enter additional alphanumeric characters by selection and actuation of the appropriate first, fixed keys 12 and second, soft keys 14 in the manner described above. In the event that an incorrect alphanumeric symbol has been selected and displayed, the user may press the "delete" key 18, to "back track" and remove the unwanted character from display 24, and then select the correct alphanumeric character by actuation of the appropriate keys.

Entry of purely numeric characters strings using keypad 10 may be achieved by actuating only the first keys, and not the soft keys that display the secondary, letter symbols. For example, the numeric character string "1234" may be entered by sequentially actuating the appropriate first keys 12 with the appropriate "1", "2", "3" and "4" primary alphanumeric symbols thereon, without actuation of any of the second keys 14. In other instances, a desired character string may require successive actuation of various second keys 14 without any intervening actuation of first keys 12. Thus, for example, the character string "FEED" may be entered by actuating the first key with "3" thereon to display the characters "D", "E" and "F" on the second keys 14, followed by successive actuation of the appropriate second keys 14 to enter "FEED".

The keypad 10 advantageously allows entry of long, complex character strings of mixed letters and numbers without any switching of view screens on the display 22. That is, the first keys 12 remain constant in appearance on the display 22 during data entry via keypad 10, with visual change occurring only in the alphanumeric characters displayed on the second keys 14 and in display field 24. Thus, a user of keypad 10 can enter any of the alphanumeric characters 16 while first keys 12 and second keys 14 remain in view.

In the embodiment shown in FIG. 1 and FIG. 2, the twelve first keys 12 and four second keys 14 of keypad 10 allow up to four secondary alphanumeric characters to be associated with each first key 12 and simultaneously displayed on second keys 14. The keypad 10 is similar to that of a conventional telephone alphanumeric keypad and use of keypad is intuitive such that new users of keypad can understand its operation with minimal instruction. In this embodiment, actuation of a first key 12 results in immediate display of the associated number symbol in field 24, while the non-numeric, alphabetic symbols are displayed on the soft keys 14. Actuation of the second keys 14 provides quick access to the non-numeric, alphabetic characters without requiring switching of a display screen image. In other embodiments, actuation of first keys 12 may result in display of all associated alphanumeric characters 15, 16 on the soft keys 14, with no character display occurring in field 24 until a second key 14 is pressed. The embodiment of FIG. 1 and FIG. 2 shows each first key 12 as included both primary and secondary alphanumeric symbols 15, 16. However, in other embodiments certain first keys 12 may include only primary alphanumeric symbols 15, and not secondary alphanumeric symbols. Generally at least one of the first keys 12 will include both primary and second alphanumeric symbols 15, 16, while in many embodiments, a plurality of the first keys 12 include both primary and second alphanumeric symbols 15, 16 as shown in FIG. 1 and FIG. 2.

Numerous variations of keypad 10 will suggest themselves to those skilled in the art upon review of this disclosure and are considered to be within the scope of this disclosure. Keypads with a different number and configuration of first keys 12 and soft keys 14 may be used to allow selective entry of alphanumeric characters corresponding to multiple different alphabets and/or writing systems. For example, a keypad in accordance with the invention is usable to allow multiple hiragana, katakana and/or kanji characters to be associated with individual first keys and selectively displayed on soft keys upon pressing the appropriate first key.

Figure 3:
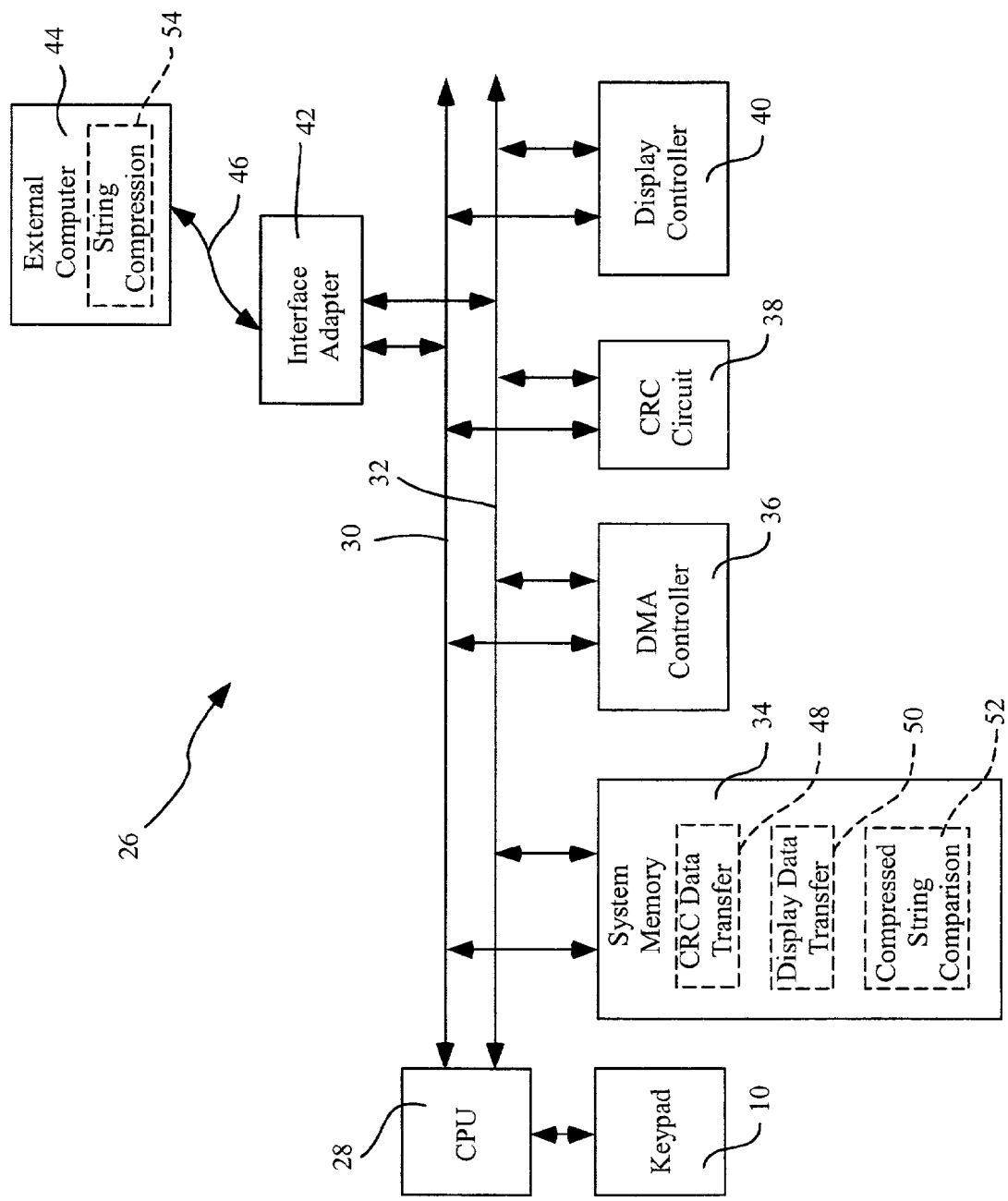
FIG. 3 is a functional block diagram of a data processing device in accordance with the invention.

Referring now to FIG. 3, the keypad 10 of the invention is used in association with a data processing device 26. Data processing device 26 may comprise a hand held computer such as a personal digital assistant or "PDA". In other embodiments, data processing device may comprise a minicomputer, a microcomputer, a PC such as an INTEL® based processing computer or clone thereof, an APPLE® computer or clone thereof, a SUN® workstation, or other like computer. In the device 26, keypad 10 is operatively coupled to a central processing unit or CPU 28 via an analog to digital converter or ADC (not shown).

CPU 28 is operatively coupled to various hardware components of device 26 via an address and data bus 30 and a control/status signal interface 32. These components include, inter alia, a system memory 34 which may comprise various memory elements (not shown) such as a DRAM primary or main memory, one or more SRAM buffers, and one or more read only memory elements in the form of ROM, PROM, EPROM, EEPROM or the like. Data processor 26 also includes a direct memory access (DMA) controller 36, a cyclic redundancy check (CRC) circuit 38, and a display controller 40. CPU 28 carries out various program operations associated with software loaded in memory 34. Data entered by users via keypad 10 in the manner described above is processed by CPU 28 and stored or buffered in memory 34 for use in program operations associated with software loaded in memory 34. DMA controller allows rapid transfer of data from memory 34 to CRC circuit 38 and display controller 40 as described further below. Display controller 40 may comprise a display controller that is operatively coupled to display 22 as shown in FIG. 1 and FIG. 2 and described above, and provides for operation of display 22. Display controller 40 includes a memory (not shown) for storage of display data.

The CPU 28, memory 34, DMA controller 36, CRC circuit 38 and display controller 40 are arranged on a motherboard (not shown) in a conventional manner and interconnected thereon by address and data bus 30 and control/processing interface 32. Data processing device 26 may comprise various additional components (also not shown) such as a hard disk drive, floppy disk drive, NIC, CD drive, and/or other conventional hardware elements. Data processing device 26 includes an interface adapter 42 that allows connection of data processor 26 to an external computer 44 via an interface cable or connection 46. Adapter 42 and interface 46 may be in the form of a GPIB, RS-232, PCI, USB, SCSI, ETHERNET®, FIREWIRE® or other IEEE 1394 interface, or other communication interface system for transfer of data to device 26 from external computer 44.

System memory 34 will generally contain a suitable operating system and software suitable for the operation of the various hardware components, which are operatively coupled to memory 34 and CPU 28 via the address/data bus 30 and control/status signal interface 32. Memory 34 also includes stored programming or software capable of carrying out various operations in accordance with the invention.

Memory 34 includes programming 48 that is capable of effecting transfer of data streams from memory 34 to CRC circuit 38 via DMA controller 36 by carrying out the operations of seeding the CRC circuit 38 with a desired initial value, setup of DMA controller circuit 36 with source and destination addresses and data stream sizes for data transfer, initiating the transfer of data to CRC circuit 38 by DMA controller circuit 36, and readout of calculated CRC values from CRC circuit 38 back to memory 34.

Memory 34 additionally includes programming 50, capable of effecting transfer of data from memory 34 to display controller 40 via DMA controller 36, wherein are carried out the operations of setup of display controller 40 with destination address information, setup of DMA controller 36 with source and destination address information and data stream size information, and initiation of data transfer to display controller 40 from memory 34 by DMA controller 36.

Also included in memory 34 is software or programming 52 capable of comparing compressed input strings to a stored list of compressed strings in memory 34 for authorization, with programming operations for acceptance of a character string input, transfer of the input string to the CRC circuit 38 for compression, searching the stored list of compressed ID strings in memory 34 for a match with the compressed input string, and validation of the compressed input string. These programming operations are described further below.

CRC circuit 38 provides for error detection in the transfer of binary data between the various hardware components of data processing device by calculation of check numbers that are used to verify the data stream at a destination. The CRC calculation is carried out by seeding a polynomial with an initial value, and then sequencing through a stream of data into which the polynomial gets divided. The dividend is used at each step as the new seed, with the division algorithm being performed by CRC circuit 38. CRC circuits of this type are well known in the art and need not be described herein.

Calculation of CRC values or numbers with a CRC circuit has traditionally involved a software loop for incrementing through the data stream and writing of bytes to the CRC circuit carried out by programming operations. CRC calculation in this manner results in a large software overhead and results in delays during calculation of check values for large streams of data. The software overhead consideration is particularly significant for hand held computing devices in which device size imposes limitations on available memory and processing power.

The subject invention overcomes this drawback by utilizing DMA controller circuit 36 in conjunction with CRC circuit 38 to perform the CRC calculation. Software 48 is used to seed CRC circuit 38 with a desired initial value, and to load the DMA controller circuit 36 with the address of the first byte in the data stream and the number of bytes in the stream for which a CRC calculation is made. The DMA controller circuit 36 then automatically transfers the stream of bytes into the CRC circuit 38 for calculation of a check value. Once the entire data stream has been processed by CRC circuit 38, software is then used to read the resulting calculated check value from CRC circuit 38 to carry out an integrity check for the data stream. Since software 48 is only employed in association with configuring the CRC circuit 38 and DMA controller circuit 36, initiating the transfer of data by DMA controller circuit 36, and readout of the check values, the overall software overhead required for calculation of the check value is small. The time required for CRC calculation using the above procedure can be an order of magnitude shorter than is achievable by transfer of data to CRC circuit 38 via software alone.

Figure 4:
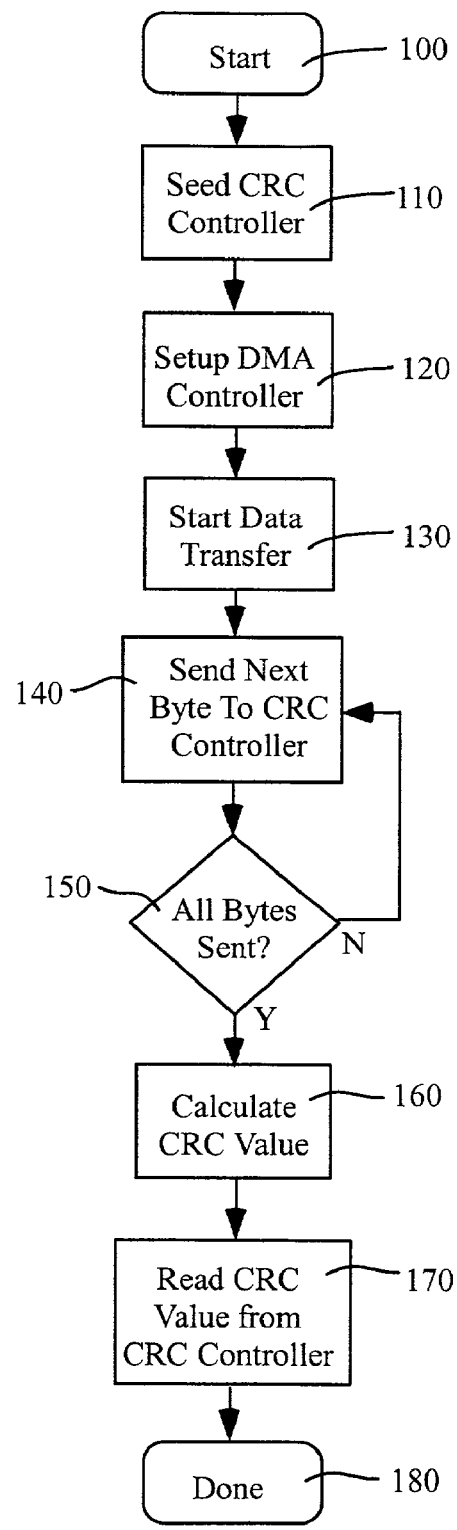
FIG. 4 is a flow chart illustrating the transfer of data from a direct memory access controller to a CRC circuit in accordance with the invention.

The calculation of check values using DMA controller circuit 36 and CRC circuit 38 in accordance with the invention will be more fully understood by reference to FIG. 4, as well as FIG. 3. At event 100, software 48 loaded in memory 34 is started or initiated which includes programming for carrying out operations associated with seeding the CRC circuit 38, setup of DMA controller circuit 36, initiating the transfer of data to CRC circuit 38 by DMA controller circuit 36, and readout of calculated CRC values from CRC circuit 38.

At event 110, CRC circuit 38 is seeded with a desired initial value for the data stream for which a CRC value is to be calculated. The initial value will vary depending upon the size of the data stream and CRC value and the degree of confidence required in the integrity of the data stream. The data stream may comprise, for example, data associated with a string of alphanumeric characters entered on keyboard 10 by a user, critical data stored in memory 34, a data stream transmitted to or from external computer 44, or any executable code associated with memory 34.

At event 120, DMA controller 36 is set up for transferring a data stream to CRC circuit 38 from memory 34. This setup will generally comprise providing a source address and a destination address for the data transfer, and the number of bytes involved in the data transfer, to DMA controller 36.

At event 130, the transfer of the data stream is initiated or started by DMA controller 36, and the first byte of the data stream is transferred by DMA controller 36 to CRC circuit. DMA controller 36 may temporarily "seize" address and data transfer bus 30 to create a DMA channel for rapid transfer of the data stream to CRC circuit 38.

At event 140, DMA controller 36 continues to send bytes of the data stream to CRC circuit 38 via address and data bus 30 in accordance with the setup information provided to DMA controller 36 in event 120.

At event 150, DMA controller 36 makes a query as to whether all bytes in the data stream have been transferred to CRC circuit 38. This query is made periodically after transfer of each byte. If all bytes in the data stream, as determined from the data stream size in the setup information from event 120, have not been sent, then event 140 is repeated. If all bytes in the data stream have been transferred, then event 160 is carried out.

At event 160 a CRC value or check number is calculated for the data stream by CRC circuit 38 using a division algorithm.

At event 170, the calculated CRC value is read from CRC controller circuit 38 into memory 34 for use in integrity checks for the data stream. At event 180, the check value calculation is completed.

The invention also uses DMA controller 36 for fast transfer of data streams to display controller 40 in order to reduce software overhead and speed up data display. Prior art data processing systems have typically used programming to execute a loop to increment data, byte-by-byte, for output to a display controller, with the overhead of the software loop increased by each byte written to the display driver. The invention overcomes this deficiency by carrying out transfer of data directly from memory 34 to display controller 40 via DMA controller 36, with programming used only in the setup or configuration of the DMA controller 36 and display controller 40, and to initiate the data transfer by DMA controller 36. By eliminating the software overhead involved in transferring bytes from memory to the display controller 40, the transfer is performed rapidly, and the display of information (text and/or graphics) takes less time, which is appreciated by the user viewing the display 22. Use of the DMA controller 36 to drive display controller 40 in this manner can provide timesavings of up to 80% or more over the conventional use of a software loop to write pixel data bytes to a display controller.

Figure 5:
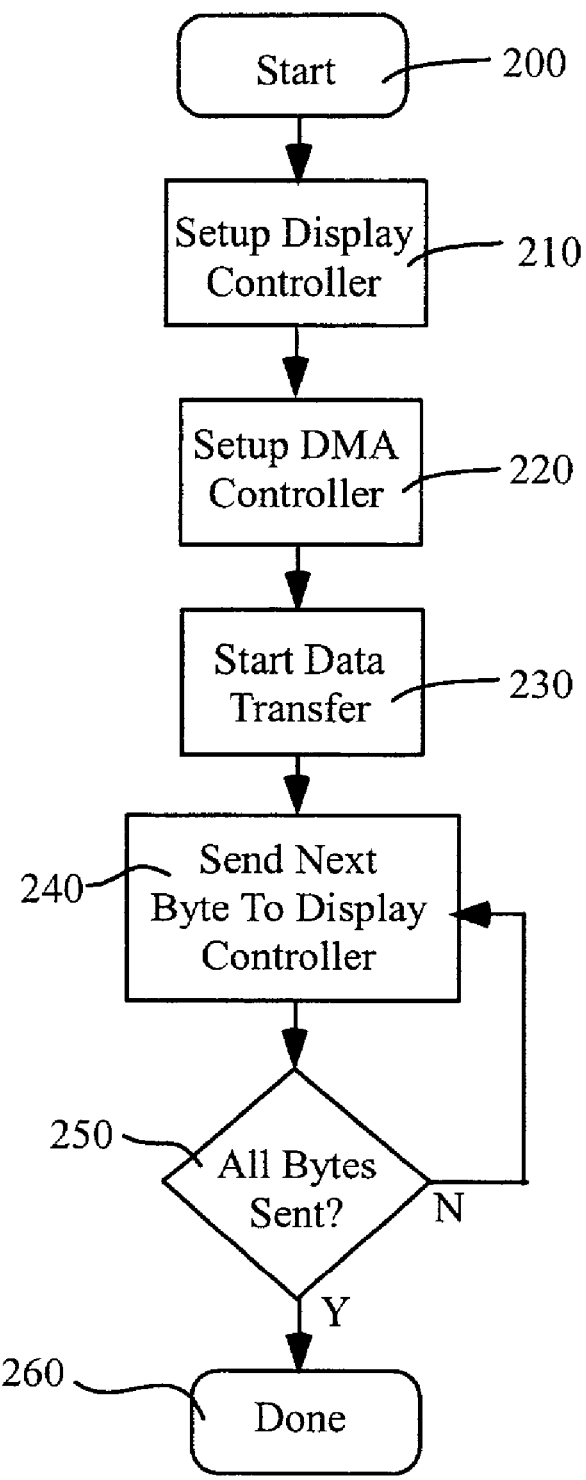
FIG. 5 is a flow chart illustrating the transfer of data from a direct memory access controller to a display controller in accordance with the invention.

Data display using DMA controller 36 in accordance with the invention will be more fully understood by reference to FIG. 5, as well as FIG. 3. At event 200, software 50 loaded in memory 34 is started or initiated which includes programming for carrying out operations associated with setup of display controller 40, setup of DMA controller 36, and initiation of the transfer of data to display controller 40 by DMA controller 36.

At event 210, display controller 40 is set up by providing display controller 40 with a "write" command and a display destination address (in the memory of display controller 40) for the data stream to be transferred to display controller 40. The data stream may comprise any displayable data such as, for example, graphical user interface (GUI) data associated with stored programming for display of icons or other features, data associated with a character or string of alphanumeric characters entered on keyboard 10 by a user, or other data stored in memory 34.

DMA controller 36 is set up in event 220 for transferring a data stream to display controller 40 from memory 34. This setup comprises providing a memory source address and the display destination address for the data transfer, and the number of bytes involved in the data transfer, to DMA controller 36.

At event 230, the transfer of the data stream is initiated or started by DMA controller 36, and the first byte of the data stream is transferred by DMA controller 36 to display controller 40. DMA controller 36 may temporarily "seize" address and data transfer bus 30 as described above to create a DMA channel for rapid transfer of the data stream to display controller 40.

At event 240, DMA controller 36 continues data transfer by sending the next byte of the data stream to CRC circuit 38 via address and data bus 30.

At event 250, DMA controller 36 makes a query as to whether all bytes in the data stream have been transferred to display controller 40 according to the setup information provided to DMA controller 36 in event 220. This query is made periodically after transfer of each byte. If all bytes in the data stream, as determined from the data stream size in the setup information from event 220, have not been sent to display controller 40, then event 240 is repeated. If all bytes in the data stream have been transferred, the process is completed at event 260.

The invention also provides for increased efficiency in data processing devices by decreasing the time and memory requirements needed for validation of user identification (ID) character strings. Hand held data processor devices typically do not have sufficient memory to store an uncompressed ID character strings. In this regard, the invention provides for compression of user ID strings by creation of CRC or check values for each authorized ID string.

The CRC values for the authorized strings are sorted and stored in a list or lookup table in the memory of an external computer 44. External computer 44 may comprise, for example, a minicomputer, a microcomputer, a UNIX® machine, a mainframe, a personal computer (PC) such as an INTEL® based processing computer or clone thereof, an APPLE® computer or clone thereof, or a SUN® workstation, or other appropriate computer with conventional hardware components (not shown) such as a motherboard, central processing unit (CPU), random access memory (RAM), hard disk drive, display adapter, other storage media, a monitor, keyboard, mouse, and other user interface means, a network interface card (NIC), floppy disk drive, CD drive, and/or other conventional input/output devices.

External computer 44 has loaded in its RAM an operating system such as UNIX®, WINDOWS® 98, WINDOWS® ME, or the like. External computer 48 may have an architecture and hardware components like that shown in FIG. 3 for data processor 26, albeit with a larger memory component suitable for storage of a list of uncompressed ID character strings. Programming 54 is loaded in the memory of the external computer 44 that is capable of calculating CRC values for a plurality of ID strings, sorting the CRC values, and storing a list of the CRC values. The sorted, stored CRC values are then transferred or downloaded to data processor 26 via interface 46 and stored in memory 34 for authorization of users of data processor 26.

When an entered or input ID character string from keypad 10 must be compared against the list of stored CRC values for authorized strings, the user-inputted ID string is compressed by calculating a CRC value therefor by programming loaded in memory 34, and a binary search is carried out for that calculated CRC value in the stored list of authorized CRC values. If the CRC value of the input ID string is found in the list of authorized CRC values in memory 34, the input ID string is validated. If the CRC value of the input ID string is not found in the list, the input ID string is unauthorized.

Different sizes of CRC values can be utilized to provide different degrees of confidence in authorization. For example, the use of 32-bit CRC values would result in only a one in 4,294,967,296 chance that an invalid input string would be validated or authorized. Use of a 16-bit CRC value provide a one in 65,536 chance or incorrect validation of an input string, and 8-bit CRC values would result in a one in 256 chance of validation of an invalid string. The size of the CRC values used may vary according to the level of security required.

The use of CRC values of character strings for validation of input string CRC values provides some important advantages over the use of full character strings for validation. The amount of space in memory 34 required for storage of a list or table of authorized strings is thus substantially reduced. For example, the storage of 4000 authorized ID strings each having up to 18 characters requires about 72,000 bytes of RAM space for uncompressed strings, which is beyond the memory capability for typical hand held data processors. Compression of the 4000 ID strings to 32-bit CRC values in accordance with the invention, however, requires memory space of 16,000 bytes for storage of the entire list. The confidence level for these stored, compressed ID strings is quite high, as noted above, with only a one in 4,294,967,296 chance of incorrect validation.

Compression of authorized ID strings into CRC values also decreases the amount of time needed to transfer a list of authorized strings from one computer to another. In the case of hand held data processors, lists of authorized ID strings are often downloaded from another machine to the hand held data processor. At a data transfer rate of 9600 baud via conventional RS-232 link, for example, approximately 72 seconds are required to transfer a list of 4000 18-byte ID strings between computers. When the 4000 ID strings are compressed to 4000 32-bit CRC values, data transfer requires only about 16 seconds at 9600 baud rate.

Figure 6A:
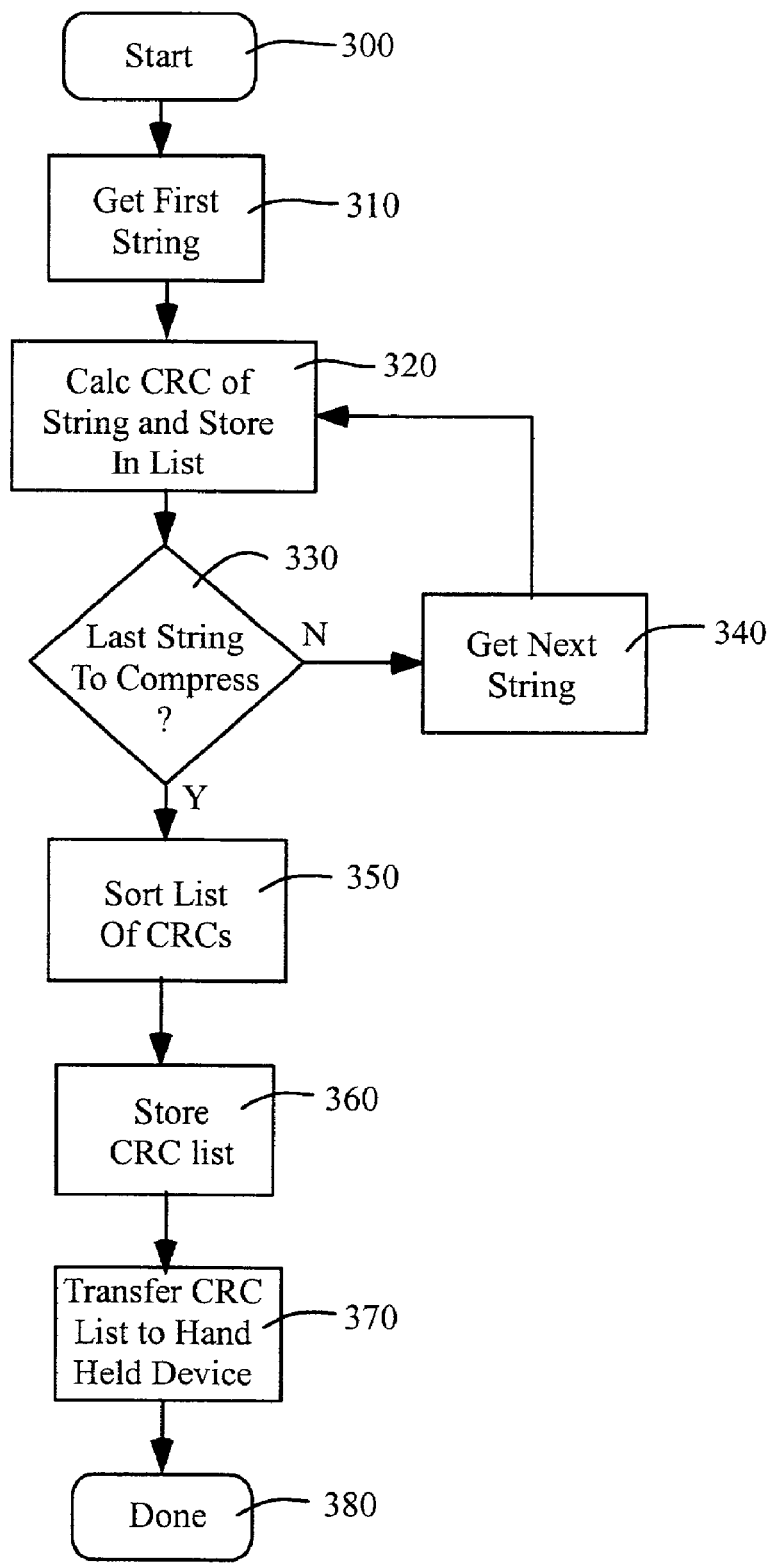
FIG. 6A is a flow chart illustrating the creation of a list of authorized check words for alphanumeric character strings.
Figure 6B:
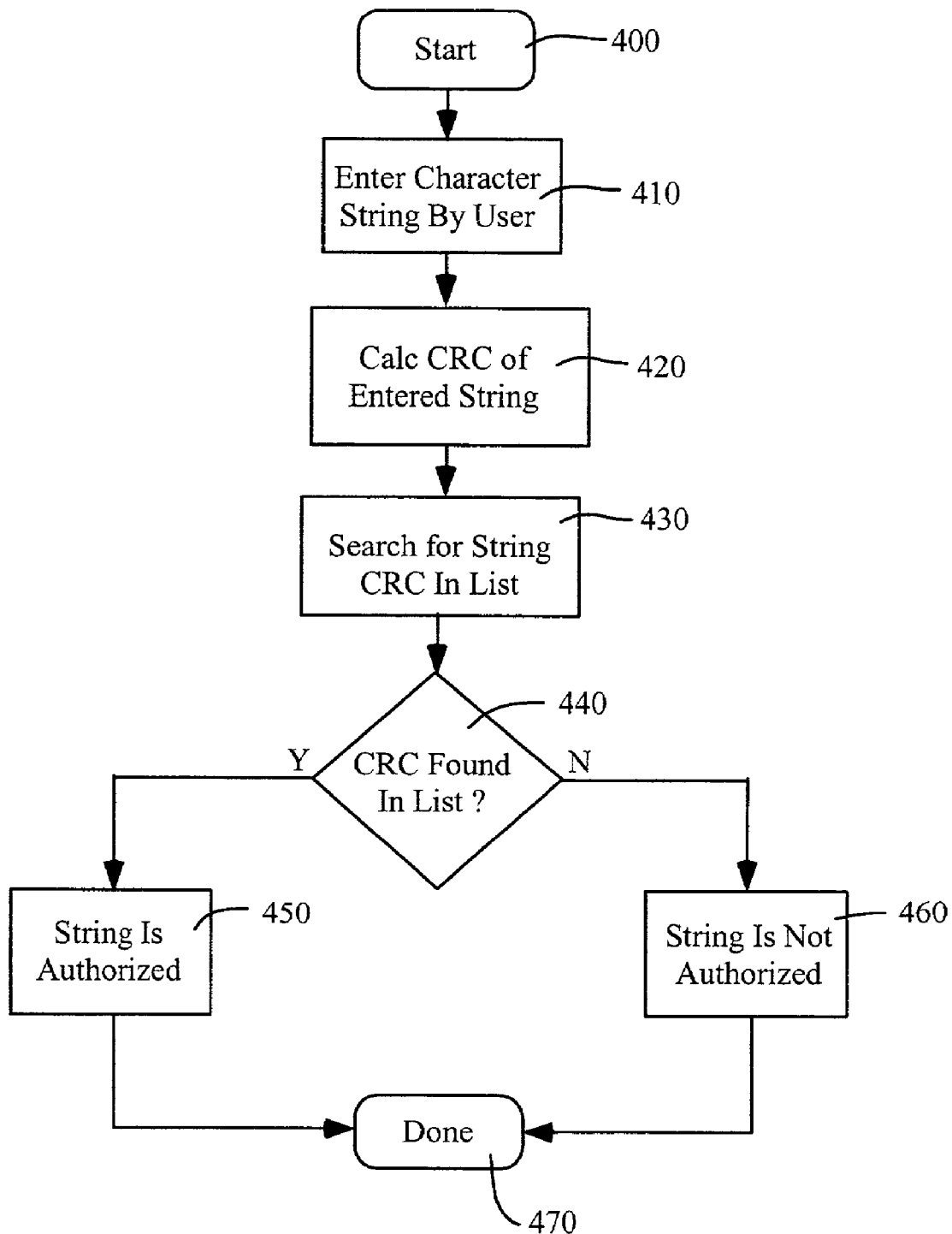
FIG. 6B is a flow chart illustrating the comparison of a alphanumeric character string to the list of authorized check words.

The use of compressed ID strings in the form of CRC values will be more fully understood by reference to FIG. 6A and FIG. 6B, as well as FIG. 3. FIG. 6A illustrates the creation of a stored list of compressed ID strings in an external computer 44 in accordance with the invention. That is, the events of FIG. 6A are carried out in association with programming 54 residing on a separate, external computer 44 having a memory sufficient to store a substantial list of uncompressed user ID character strings. The events of FIG. 6B show the use of the compressed ID string list in the data processor 26 for authentication of a user-inputted ID string.

The use of compressed data strings for authentication or validation purposes is also described in U.S. patent application Ser. No. 10/008,522 to inventors David Hohl et al., filed concurrently herewith, the disclosure of which is incorporated herein by reference.

At event 300 in FIG. 6A, programming 54 in the external computer 44 is initiated or started to create a list of compressed, authorized identification or ID strings. This programming carries out operations associated with acquiring authorized ID strings, compressing the ID strings by calculating CRC values therefor, and sorting and storing of a list of compressed ID strings.

At event 310, the first ID string is obtained from the memory of the external computer 44, and in event 320, the ID string is compressed by calculating a CRC value for the string. This compression event may be carried out by conventional software techniques, as the external computer 44 will typically have sufficient memory and processing power for an all-software compression operation. Alternatively, the compression may be carried out with a CRC circuit together with a software loop for carrying out the division algorithm. It is also contemplated that the external computer 44 may be configured in the manner of data processor 26, with data associated with each string transferred directly from memory to a CRC circuit via a DMA circuit in the manner shown in FIG. 4 and described above, with minimal software aspects involved in the compression. The compressed CRC value obtained in event 320 is stored in a list of compressed strings in the memory of the external computer.

At event 330, a query is made by programming in the external computer as to whether the last string to be compressed has been retrieved from the memory of the external computer. If the last string to be compressed has not yet been received and compressed, event 340 is carried out. If the last string has been received from memory and compressed, event 350 is carried out.

Event 340 provides for retrieving the next uncompressed ID character string from memory, after which event 320 is repeated to compress the string by calculating a CRC value therefor. Following compression of the last ID string, at event 350, the list of compressed ID strings, which is now in the form of a list of corresponding CRC values, is sorted. In event 360, the sorted list is stored in the memory of the external computer used for the compression process of FIG. 6A.

At event 370, the stored list of CRC values is downloaded or transferred to the hand held data processor 26 for use in user authorization as shown in FIG. 6B. Transfer of the stored list of compressed ID strings may be carried out by data transfer via GPIB, RS-232, PCI, USB, SCSI, ETHERNET®, FIREWIRE®/IEEE 1394, or other type of communication interface from the external computer 44 to data processor 26. The list of CRC values is stored in system memory 34. At event 380, the ID string list compression operation is completed. It should be noted that, in certain embodiments, the events 300 through 370 may be carried out on data processor 26 provided that memory 34 has sufficient capacity. In such cases, the downloading or transfer of the completed list of compressed ID strings in event 370 may be omitted.

Referring now to FIG. 6B, at event 400, programming in memory 34 is started for comparison of a user-entered ID string to the stored list of compressed ID strings prepared as described above. This programming carries out operations associated with the transfer of a data stream corresponding to the entered ID string from memory 34 to CRC circuit 38 for compression, searching of the list of compressed ID strings for a match with the compressed, entered ID string, and making a validation decision for the compressed, entered ID string. Event 400 may in certain embodiments be triggered by event 410 described below.

Referring also to FIG. 1 and FIG. 2, at event 410 a user enters a string of alphanumeric characters corresponding to a user ID string by selective actuation of appropriate first keys 12 and second keys 14 on keypad 10 in the manner described above.

At event 420, the input ID string entered by the user is converted to a compressed input ID string in the form of a corresponding CRC value. Event 420 encompasses the events 110 through 170 described above with reference to FIG. 4. That is, the CRC circuit 38 is seeded with a desired initial value, DMA controller 36 is set up for transfer of the data stream corresponding to the input ID string of event 410 from memory 34 to CRC circuit 38, the CRC value for the input ID string is calculated by CRC circuit 38, and the calculated CRC value for the input ID string is read from the CRC circuit 38 back to memory 34.

At event 430, the list of CRC values for authorized ID strings in RAM 34, created in 310–360 as described above, is searched for matches with the CRC value for the input ID string calculated in event 420. The CRC value for the input ID string is compared to individual stored CRC values in the list until a match is found At event 440, a query is made as to whether a match has been found, i.e., whether the CRC value for the input ID string is found in the list of stored CRC values for authorized strings. If the CRC value for the input ID string is found in the list, event 450 is carried out. If the CRC value for the input ID string is not found in the list, event 460 is carried out. Event 440 may be carried out for each comparison between the CRC value of the input ID string and the individual stored CRC values for authorized strings, such that the determination in event 440 can occur upon detection of a match, and prior to search of the entire list.

At event 450, the input user ID string entered in event 410 is authorized according to a match between the CRC value for the input ID string and one of the stored CRC values for authorized ID strings. Following event 450, the validation of the user ID string is complete at event 470. Additional events associated with user ID string validation (not shown), may also occur, such as programming operations associated with providing access to stored secure information to the user.

At event 460, the user ID string entered in event 410 is not authorized. Any subsequent events that may occur with authorization of the user ID string, as provided in event 450, are not carried out, and event 470 occurs. In certain embodiments, event 410 may be repeated by a user to allow re-entry of an ID string, followed by events 420–440 again to determine the validity of the re-entered user ID string.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. A method for data entry and display, comprising:
   providing a data entry and display device comprising a
   keypad including an arrangement of individual keys and a display having a display field that is distinctly provided outside of the arrangement of individual keys, the arrangement of individual keys including a plurality of hard keys and a plurality of soft keys that are covering a portion of the display that is provided at least partially within the arrangement of individual keys, each said hard key having a primary alphanumeric symbol and a set of secondary alphanumeric symbols visibly associated therewith;

actuating a first said hard key; and displaying on said plurality of soft keys by use of the display portion covered by the plurality of soft keys a first said set of said secondary alphanumeric symbols from said actuated first said hard key.

2. The method of claim 1, further comprising selecting one of said alphanumeric symbols associated with said actuated first said hard key.

3. The method of claim 2, wherein said selecting comprises:

actuating a selected one of said soft keys to select one of said first set of secondary alphanumeric symbols; and displaying said selected one of said first set of secondary alphanumeric symbols on a display field.

4. The method of claim 3, further comprising actuating a second said hard key; and displaying on said plurality of soft keys a second set of said secondary alphanumeric symbols from said actuated second said hard key.

5. The method of claim 4, further comprising selecting one of said alphanumeric symbols associated with said actuated second said hard key.

6. The method of claim 5, wherein said selecting comprises:

actuating a selected one of said soft keys to select one of said second set of secondary alphanumeric symbols; and displaying said selected one of said second set of secondary alphanumeric symbols on a display field.

7. The method of claim 6, further comprising actuating an nth said hard key; and displaying an nth set of said secondary alphanumeric symbols from said actuated nth said hard key in association with said soft keys.

8. The method of claim 7, further comprising selecting one of said alphanumeric symbols associated with said actuated nth said hard key.

9. The method of claim 8, wherein said selecting comprises:

actuating a selected one of said soft keys to select one of said nth set of secondary alphanumeric symbols; and displaying said selected one of said nth set of secondary alphanumeric symbols on a display field.

10. The method of claim 1, wherein the keypad comprises a display onto which the plurality of hard keys and the plurality of soft keys are superimposed so that the hard keys are visibly associated with the primary alphanumeric symbols and set of secondary alphanumeric symbols and so that the secondary alphanumeric symbols of a hard key can be display on the plurality of soft keys.

11. A data entry and display device comprising a keypad including an arrangement of individual keys and a display having a display field that is distinctly provided outside of the arrangement of individual keys, the arrangement of individual keys including a plurality of hard keys and a plurality of soft keys that are covering a portion of the display that is provided at least partially within the arrangement of individual keys, each said hard key having a primary alphanumeric symbol and a set of secondary alphanumeric symbols visibly associated therewith, wherein the data entry and display device further comprises a control system so that by actuating a first said hard key, the set of secondary alphanumeric symbols of that hard key will be displayed selectively on the plurality of soft keys by use of the display portion that is covered by the plurality of soft keys.

12. The device of claim 11, wherein the keypad comprises a display onto which the plurality of hard keys and the plurality of soft keys are superimposed so that the hard keys are visibly associated with the primary alphanumeric symbols and set of secondary alphanumeric symbols and so that the secondary alphanumeric symbols of a hard key can be display on the plurality of soft keys.

* * * * *